Nov. 26, 1957 A. E. NESSLER ET AL 2,814,114
CHEESEMAKING APPARATUS
Filed May 10, 1954 5 Sheets-Sheet 1

Inventors.
Joseph G. Hartman.
Aldo E. Nessler.
By. Evans, Kiester & Anderson
Attorneys.

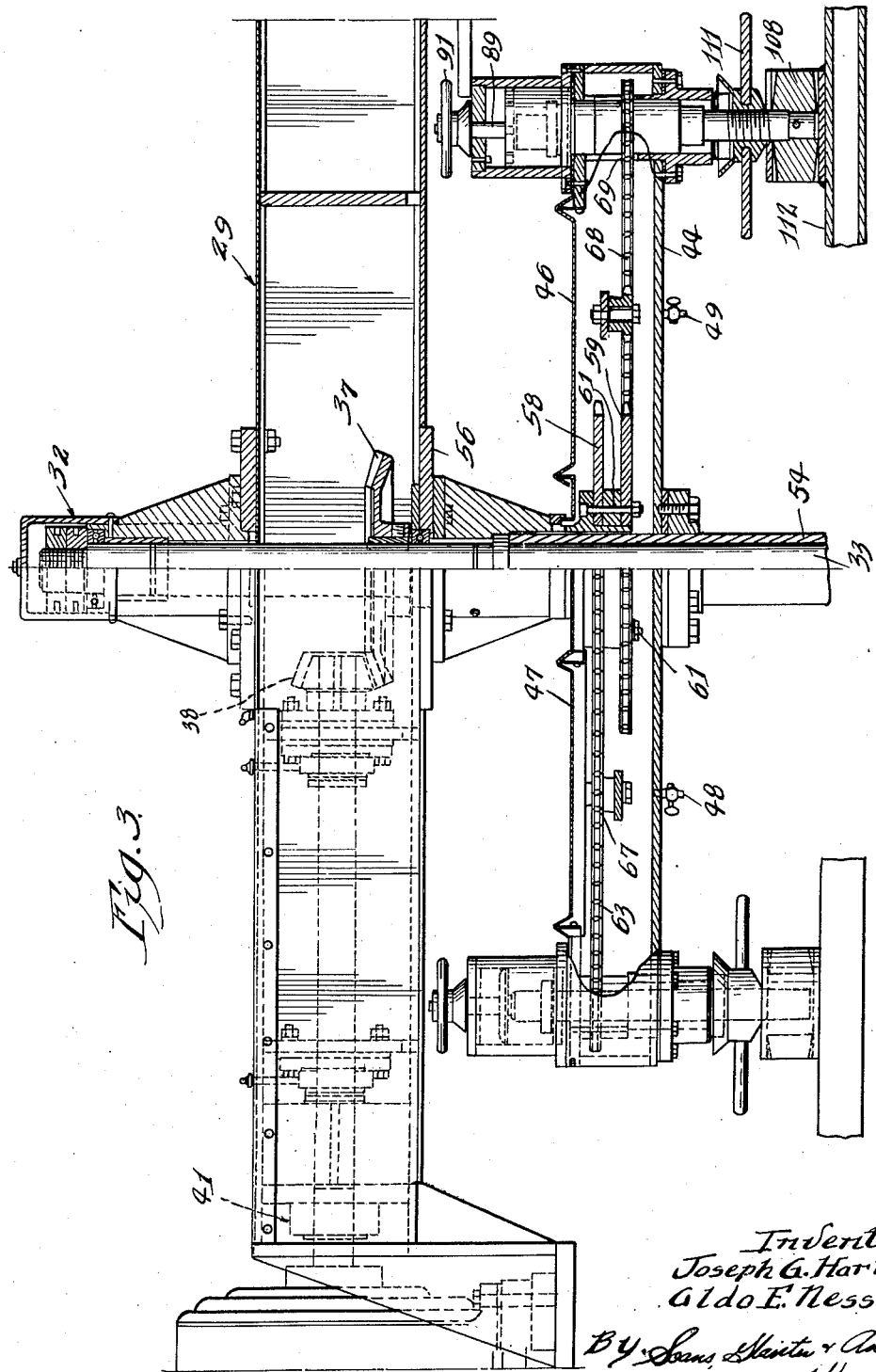

Nov. 26, 1957  A. E. NESSLER ET AL  2,814,114
CHEESEMAKING APPARATUS
Filed May 10, 1954  5 Sheets-Sheet 3
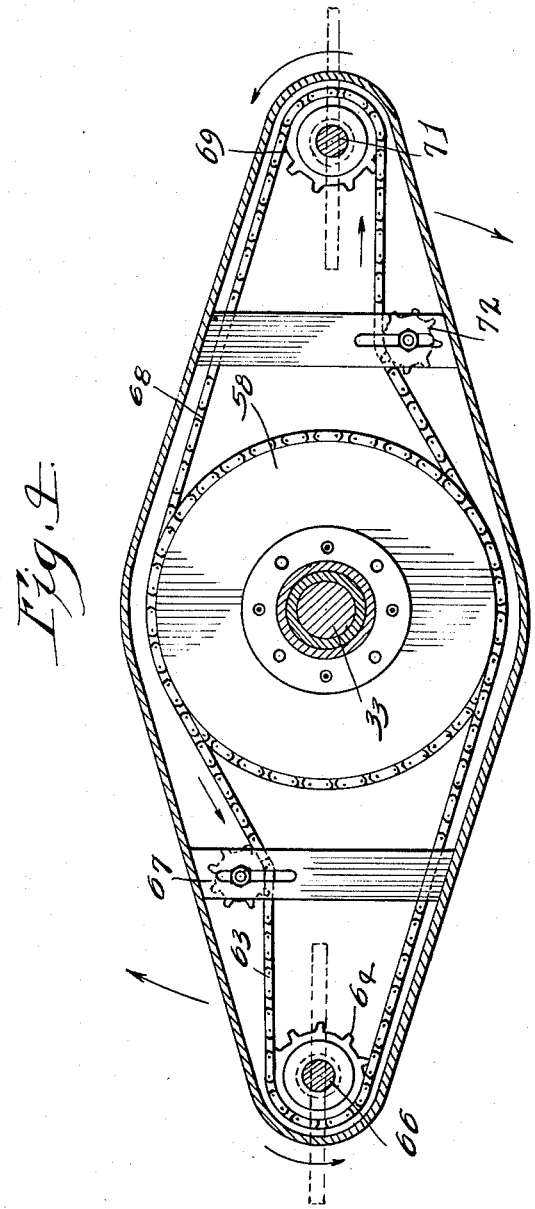
Inventors.
Joseph G. Hartman.
Aldo E. Nessler.
By Isaacs, Haister & Anderson
Attorneys.

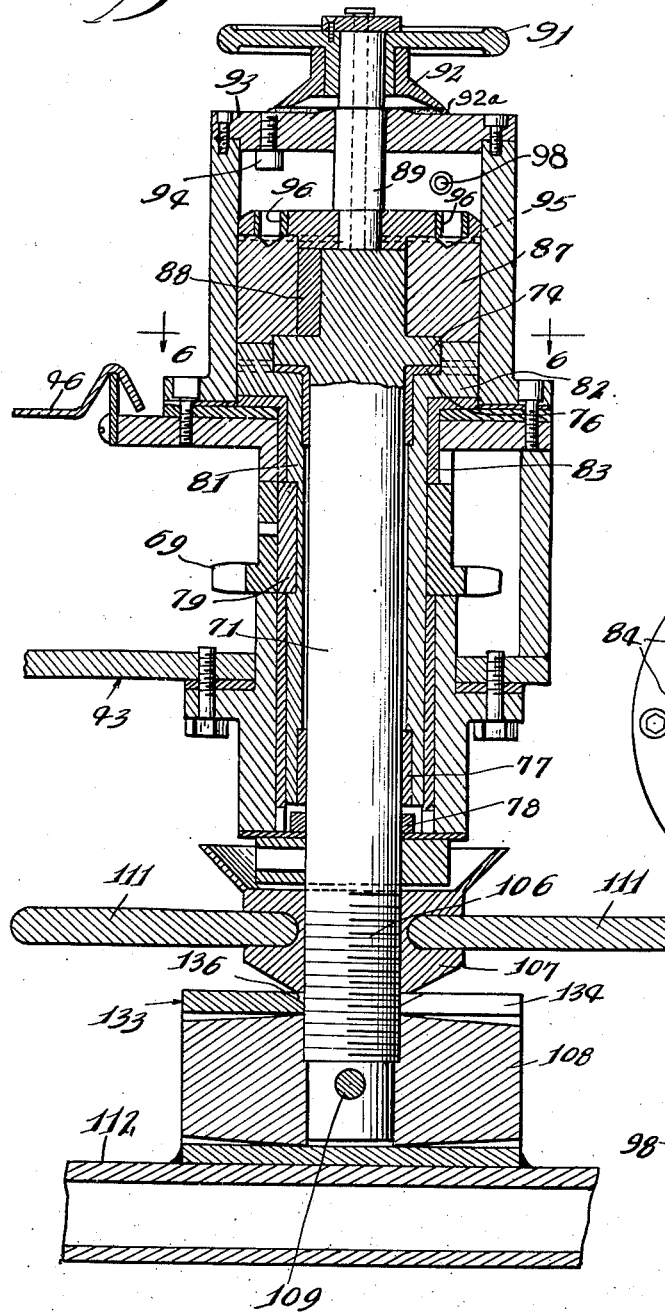

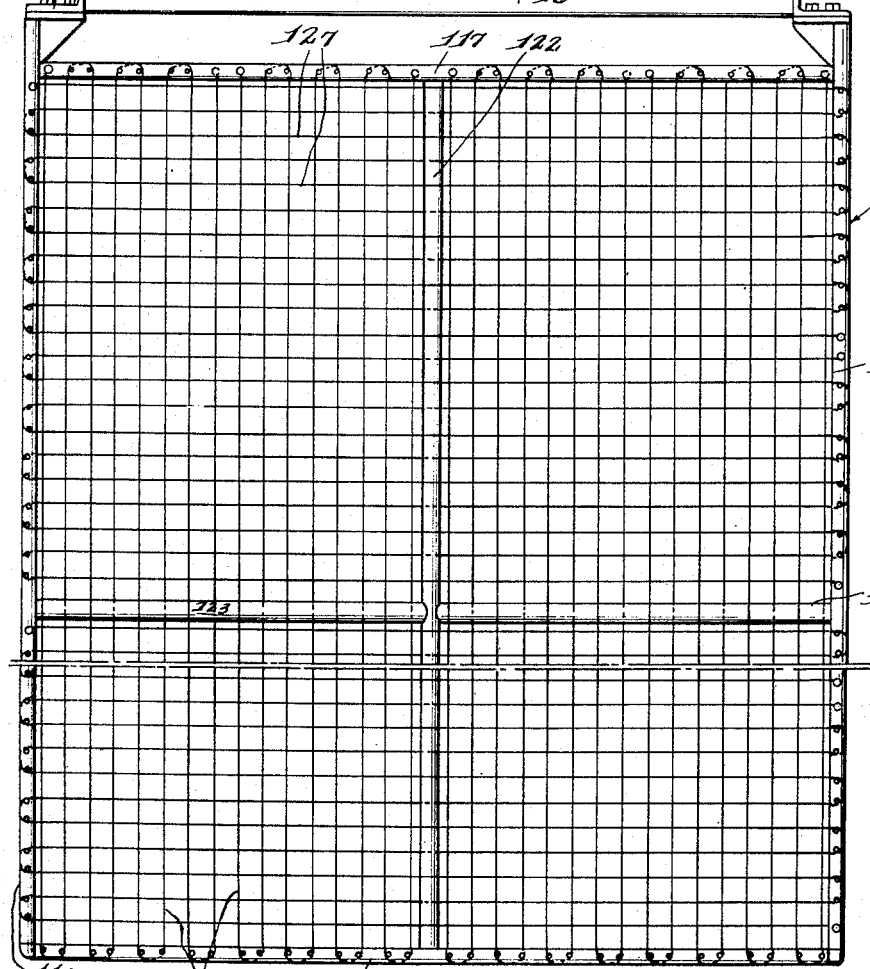

United States Patent Office 2,814,114
Patented Nov. 26, 1957

2,814,114

CHEESEMAKING APPARATUS

Aldo E. Nessler, Evanston, and Joseph G. Hartman, Wilmette, Ill., assignors to National Dairy Products Corporation, a corporation of Delaware Application May 10, 1954, Serial No. 428,731

8 Claims. (Cl. 31—48)

The present invention is directed to improved cheesemaking apparatus which includes a highly efficient mechanical agitating system and improved curd cutting and working apparatus.

In the production of cheese in a cheese factory the "make procedure" usually takes place in a large horizontally disposed vat which holds from one thousand to ten or more thousand pounds of milk. Usually, the tanks are rectangular and agitation in the vat is accomplished by mechanical agitators which travel up and down the length of the vat on a track which is suspended over the vat. The rectangular vat is used quite extensively despite the obvious difficulty that the curd is not uniformly agitated during the make procedure due to the fact that the travelling mechanical agitators are only in one given section of the vat for only a short period of time, and the elongated shape of the vat is such that the agitating action is more or less localized. Also, heating of the curd is not efficiently carried out because there is an extremely large surface area of curd and whey exposed to the room air. Furthermore, it is difficult to clean a vat having the square corners which are inherent in a rectangular vat construction.

Some use has been made of cylindrical tanks having a vertically disposed axis for cheesemaking because this shape makes possible more uniform heating and agitation, but these cylindrical tanks have not been extensively used because of the difficulties involved in cutting the set curd into pieces of the desired size with the regular manual curd cutting equipment since this manual equipment requires that every portion of the vat is within reach of the cheesemaker.

Some attempts have been made to provide mechanical cheese cutting equipment but mechanical operation during the cutting stage has been generally unsatisfactory because the particles of curd are not uniform in size.

One of the principal objects of the present invention is to provide an improved cheesemaking apparatus having mechanical means therein for agitating the milk and the curd as well as for cutting the curd efficiently into pieces of the desired size. Another object of the present invention is to provide an improved cheesemaking assembly provided with means for quickly and conveniently changing the apparatus from a milk agitating assembly to a curd agitating and cutting assembly and so on, through the cheesemaking process.

A further object of the present invention is to provide an improved cylindrical cheesemaking vat with efficient curd cutting means.

A still further object of the invention is to provide improved cheese harp or curd knife assemblies for cutting and working cheese curd.

A further description of the present invention will be made in conjunction with a description of the attached sheets of drawings which illustrate the principles of the present invention as applied to one preferred embodiment of cheesemaking apparatus.

In the drawings:

Figure 3 is an enlarged fragmentary view in elevation and partially in cross-section ilustrating the drive mechanism for the apparatus;

Figure 4 is an enlarged schematic view of the chain and sprocket assembly employed to drive portions of the apparatus;

Figure 5 is an enlarged view in elevation and partly in cross-section, illustrating the construction of a portion of the cheesemaking apparatus which drives the various agitating and cutting mechanisms;

Figure 6 is a view taken generally along the line 6—6 of Figure 5;

Figure 7 is a fragmentary view of the detent mechanism employed in the apparatus;

Figure 8 is an enlarged view in elevation of a beater harp structure which embodies the improved cheese harp construction;

Figure 9 is a plan view of the beater harp assembly of Figure 8;

Figure 10 is an enlarged view taken generally along the line 10—10 of Figure 8;

Figure 11 is an end elevational view of the assembly shown in Figure 8; and

Figure 12 is an enlarged sectional view taken generally along the line 12—12 of Figure 11.

Figure 1:
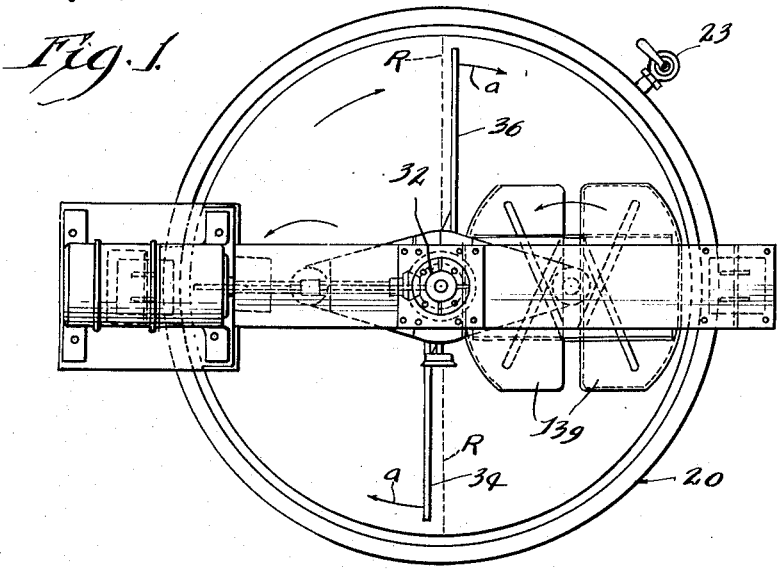
Figure 1 is a plan view of the apparatus.
Figure 2:
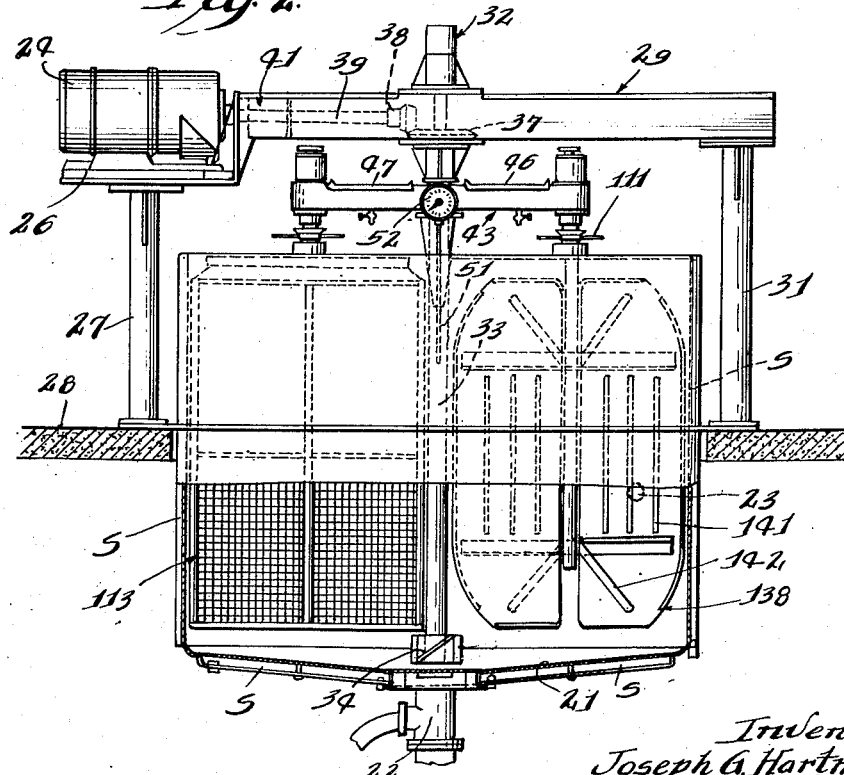
Figure 2 is a view in elevation of the apparatus shown in Figure 1 with portions thereof being broken away.

Referring to Figures 1 and 2, it will be seen that the cheesemaking assembly illustrated includes a substantially cylindrical tank 20 provided with a sloping base wall 21 which provides for drainage of curd and whey to the center of the tank 20 from whence it can be discharged by means of a valve 22 located at the center of the tank 20.

Located centrally of the tank 20 is another discharge valve 23 through which supernatant whey may be discharged from the tank 20.

The drive means for the entire assembly may consist of a motor 24 mounted on a base 26 which is supported on a support leg 27 resting on a support surface 28. The motor base 26 is conected to a bridge assembly generally indicated at 29, the latter being supported in its elevated position by another support leg 31.

The bridge member 29 may consist of structural steel sections suitably fastened together. Centrally of the bridge member 29 there is a bearing member 32 which supports a centrally disposed shaft 33 for rotation within the tank 20. At its lower end, the shaft 33 carries a pair of outwardly extending scraper blades 34 and 36 which ride as best illustrated in Figs. 1 and 2.

The scraper blades 34 and 36 are preferably located in such manner as to facilitate discharge of curd and whey from the vat and to set up forces which tend to cause any dense foreign objects to move toward the outer walls of the vat. This can be accomplished by supporting the scraper blade in such manner that it is not radially extending but so that instead, it sweeps the bottom of the vat with the outer end lagging behind the inner end of the blade. In the illustrated structure this is accomplished by arranging the blades 34 and 36 parallel to a radius of the vat (indicated as R in Fig. 1) and spaced forwardly of the radius in the direction of movement of the blades indicated by the arrows (a) in Fig. 1. This arrangement causes dense objects to move toward the periphery of the vat incident to the movement of the blades through the whey and, in addition, causes the curd and whey to drain substantially simultaneously from the vat so that it is unnecessary to shovel curd from the vat at the end of the operation. Such an arrangement is highly desirable as it results in a saving of labor and in keeping foreign objects which may accidentally fall into the vat, e. g., tools, etc. from being incorporated in the cheese.

Secured to the shaft 33 below the support bearing 32 is a bevel gear 37 (Figs. 2 and 3). A pinion 38 meshes with the bevel gear 37, the pinion 38 being secured to a drive shaft 39 which is powered by the motor 24. Interposed between the motor 24 and the pinion 38 is an overrunning clutch assembly generally indicated at numeral 41 in the drawings. Overrunning clutch mechanisms are, per se, well known for various uses and will not be described in detail in this specification. The function of the clutch 41 will become apparent in a subsequent portion of the specification.

Also secured to the centrally disposed shaft 33 and rotatable therewith is a sub-frame assembly generally indicated at numeral 43 in the drawings. The sub-frame 43, as illustrated best in Fig. 3, may consist of an open topped pan 44 which is constructed to support driving members and curd working attachments as will be hereinafter described. The pan 44 provides in effect a pair of radially disposed arms about the shaft 33. The pan 44 is provided with removable covers 46 and 47 permitting access to the interior of the pan. A pair of drain cocks 48 and 49 may be provided in the pan 44 to drain off any accumulated liquid. The sub-frame 43 may also carry a temperature measuring device 51 having a scale 52 from which the temperature reading inside the tank may be taken.

The assembly described thus far provides a rotary central shaft with a sub-frame assembly suitable for receiving implements such as agitating means, cutting means, and the like during different stages in the manufacture of the cheese. The present invention provides the further improvement of providing means for selectively rotating the implements carried by the sub-frame 43 in a planetary fashion about the centrally disposed shaft 33. This additional rotational movement of the implements about their own axes while the sub-frame 43 itself is rotating about the centrally disposed shaft 33 provides a very high mixing efficiency, with the result that the curd produced is of substantially uniform texture and consistency.

In the assembly shown in the drawings, the rotation of the implements carried by the sub-frame 43 is powered by the rotation of the central shaft 33. As best seen in Fig. 3, the shaft 33 is received within a bearing member 54. The bearing 54 is received within a flanged support member 56 secured to the bridge member 29. The support member 56, as illustrated in Fig. 3, carries a pair of stationary sprockets 58 and 59, the sprockets being secured to the support member 56 by means of bolts 61. As best illustrated in Fig. 4, the sprocket 58 has a chain 63 trained about its periphery and arranged to drive a sprocket 64 secured to a shaft 66. A movable tensioning sprocket 67 is also provided to adjust the tension on the chain 63 as desired.

Similarly, the sprocket 59 is provided with a chain 68 which is arranged to drive a sprocket 69 located on a shaft 71. A tensioning sprocket 72 is also included to adjust the tension on the chain 68.

As previously brought out, during the cheese-making operation it is desirable to provide means for efficient agitation and cutting of the curd and, in the case of Swiss cheese, for beating of the curd after its formation. To accomplish all of these functions, the assembly of the present invention provides for a readily interchangeable set of implements which are arranged to be engaged at opposite ends of the rotatable sub-frame assembly. Means are also provided to rotate these implements about their own axes while the sub-frame itself is rotating about the central axis of the vat. Means are also provided to lock the implements, for example, a cutting harp or curd knife, in a fixed radial position for the cutting operation.

The ends of the sub-frame 43 are provided with implement receiving mechanisms which receive the various implements such as the paddles, cutting harps, and beating harps, interchangeably. Inasmuch as both of these implement receiving means are identical, only one has been illustrated in the drawings in Fig. 5.

As illustrated in Fig. 5, the implement receiving means may include a centrally disposed shaft 71 having an enlarged annular portion 74 bottomed on a flange bearing 76. A second bearing 77 is provided centrally of the shaft 71 and a seal ring 78 is disposed immediately below the bearing 77 to prevent drainage of oil.

The sprocket 69 is connected by means of a key 79 to a sleeve 81 so that rotation of the sprocket 69 serves to rotate the sleeve 81. The sleeve 81 has an enlarged flange portion 82 disposed between the flange bearing 76 and a second flange bearing 83. A disengageable driving connection between the sleeve 81 and the shaft 71 is provided by means of a plurality of circumferentially spaced slots 84 (Fig. 6) on the flange portion 82 which engage diametrically spaced teeth 86 formed on a collar 87. The collar 87, in turn, is keyed to the shaft 71 by means of a key 88. As long as the teeth 86 are engaged in a pair of slots 84, there will be a driving connection between the sprocket 69 and the central shaft 71. As long as the driving connection exists, the central shaft 71 will be rotated in response to movement of the central shaft 33 in the tank 20, thereby providing an additional rotational movement about its own axis.

In employing the cutter harps, however, it is desirable initially to lock the harp against rotation on its own axis. This is accomplished in the structure of the present invention by providing a sleeve 89 which is threaded into the collar 87 and rotates with it. The opposite end of the sleeve receives a hand wheel 91 mounted for rotation in a bearing 92. The bearing 92 is welded, as by weld 92a, or otherwise secured to a cover member 93 provided with a bolt 94 extending therethrough with the headed portion of the bolt 94 facing the collar 87. The top of the collar 87 is provided with a plurality of circumferentially spaced recesses 96 of sufficient diameter to accommodate the head of the bolt 94. Thus, upon raising the sleeve 89 and hence the collar 87, a slight turning of the hand wheel 91 will be effective to set the bolt 94 in one of the recesses 96 so as to lock the collar 87 against relative movement with respect to the cover member 93.

A detent mechanism is also provided for holding the collar 87 out of engagement with the sleeve 81. This mechanism is best illustrated in Fig. 7 of the drawings. As shown in this drawing, the detent may include a sleeve 97 extending into the housing containing the implement receiving mechanism. A set screw 100 is provided to lock the sleeve 97 in position. Slidable within the sleeve 97 is a pin 98 having one end extending into the space between the cover member 93 and the collar 87 when the elements are in the position shown in Fig. 5. The pin 98 has an annular collar 99 against which a coiled spring 101 is arranged to operate, forcing the pin 98 into engagement with a suitable slot or aperture 95 on the collar 87. The pin 98 may be retracted by movement of a hollow stud 102 having a threaded portion 103 received within a locking nut 104.

One end of the shaft 71 is provided with a threaded portion 106 which engages an internally threaded tapered collar 107. The collar 107 is provided with a pair of arms 111 by means of which the collar 107 is positioned in any desired position along the threaded portion 106 of the shaft 71. A wedge block 108 is secured to the extreme end of the shaft 71 by means of a pin 109, as illustrated in Fig. 5.

One of the features of the present invention resides in providing a unique type of harp or curd knife structure which is capable of being readily cleaned and which can be strung in a number of patterns so as to make it possible to employ a single harp frame for a variety of purposes. For example, the harp may be strung to make vertical cuts or horizontal cuts or to effect both cuts at the same time or it can be employed as a beater harp for use in the manufacture of Swiss cheese.

The structure as applied to a beater harp is best illustrated in Figs. 8 through 12 of the drawings. It will be seen that the frame structure includes a channel member 112 secured to a frame structure 113 by means of a pair of end flanges 114 and 116. The frame structure 113 itself may include a top member 117, a bottom member 118, and side members 119 and 121 which define a generally rectangular frame assembly. The frame structure 113 may, if made in large sizes, also be provided with a vertical bracing member 122 and a horizontal bracing member 123 as illustrated.

The frame members forming the outside boundaries of the harp structure, as shown in Fig. 12, are preferably generally elliptical in cross section to facilitate cleaning and to minimize disturbance as the frame passes through the curd and whey mixture. The frame members are each provided with a series of spaced pins or cylindrical projections 124, the pins 124 being welded, as by weld 124a, or soldered or otherwise secured to the frame members. As best illustrated in Figs. 11 and 12, each frame member may also have a number of headed pins 126 spaced along the frame member and welded, as by weld 126a, or otherwise secured thereto, for the purpose of providing an anchor for the ends of the wires strung across the harp. As seen in Fig. 11, the pins are preferably arranged in staggered relation on opposite sides of the frame member, and, as shown in Fig. 8, the pins are located entirely outside the area of the frame 113 defined by the inner surface of the members 117, 118, 119, and 121. This positioning and the construction of the pins makes it considerably easier to clean the harp after the cutting operation, since there is no opportunity for curd particles to become lodged in sockets, eyes, or other fastening means employed in other types of harp constructions.

The beater harp illustrated in Fig. 8 includes horizontally extending wires 127 and vertically extending wires 128 of substantially equal spacing. With the harp structure shown, however, the disposition of the wires can be changed very readily, as for example, when the harp is to be used for different types of cheeses. It is common practice for the cheese industry to use a harp structure for Cheddar cheese which is different from that employed, for example, in the manufacture of Swiss cheese, and the harp structure described lends itself to a rapid changeover from one type of cheese to the other.

As best seen in Figs. 9 and 10, the channel member 112 has a pair of lifting handles 131 and 132 welded to it at opposite ends. Centrally of the channel 112 there is provided a chuck 133 for receiving the shaft and block 108 of the drive assembly. The chuck 133, as illustrated in Figs. 9 and 10, has a slot 134 in the upper portion thereof, which slot has a tapered seating surface 136 near the center of the chuck 133. This slot 134 enables the wedge block 108 (Fig. 5) to be slipped into the chuck 133 while the block 108 is still screwed to the threaded portion 106 of the shaft 71. The shaft 71 is then locked in position by rotation of the arms 111 on the collar 107, causing the tapered base of the collar 107 to become seated against surface 136 formed in the top of the chuck 133.

A similar securing means is employed to secure other implements such as the agitator elements 138 illustrated in Figs. 1 and 2 of the drawings. As seen in these two figures, the agitator elements 138 may consist of a plurality of horizontally disposed paddle members 139, vertically disposed paddle members 141, and angularly disposed paddle members 142.

In a typical operation of the apparatus in making Swiss cheese, the milk was introduced into the tank 20 with a paddle and one harp disposed on the sub-frame 43. The harp consisted of the type of framework illustrated in Fig. 8, except that it contained only vertically strung wires, the spacing between the wires being about ⅜ inch and it extended down to almost the bottom of the tank. Milk was added to the tank, during which time the contents of the vat were agitated. During this agitation period, the clutch mechanism illustrated in Fig. 5 of the drawings was engaged so that both the harp and the paddle were rotated on their own axes jointly with their rotation about the shaft 33. At the same time the milk was warmed to the proper degree, the heat being supplied through the steam jacket illustrated as S in Fig. 2. When the vat was full, the usual starter culture was added and mixed into the milk with the agitator and at the proper time rennet was added and mixed for several minutes with the agitator paddle. The paddle was replaced by a second harp having wires strung in a horizontal direction only, the spacing between the wires also being ⅜ of an inch. The clutch mechanism 84–86 shown in Fig. 6 was then disengaged and the two harps were locked in a fixed position along their axes of rotation through means of the bolt 94 and recess 96 seen in Fig. 5. The curd was allowed to set for a period of about thirty minutes, at which time the curd had achieved the firmness desired by the cheesemaker.

With the harps locked in position, the curd was cut by energizing the motor 24. In cutting the curd, the shaft 71 was rotated until the curd started to move with the cutting harps as the inertia of the curd was overcome. At this point the motor was de-energized and the overrunning clutch mechanism 41 was then operable to permit the cutting harps to rotate freely with the contents of the vat and maintaining them in the same relative position in the curd mass which they had occupied when the motor was de-energized. After the contents of the vat stopped moving, the motor was started again to complete the cutting. This multiple cutting operation, made possible by the overruning clutch maintaining the harps in the curd at a substantially fixed position, effectively prevents double cutting of the curd which occurs when there is a non-slipping connection between the motor and the drive shaft.

After cutting of the curd into annuli, each of equal cross-section, the harps were unlocked, following a ten minute wait, and the clutch mechanism 84–86 shown in Fig. 6 was again engaged. The motor was energized and the harps were rotated along their own axes as well as about the central axis of the vat to chop up the curd into more or less uniform pieces. During this cutting, more whey was expressed from the curd.

After the harping operation, some types of cheeses, notably Swiss, require a foreworking period prior to cooking. The apparatus of the present invention is particularly well suited to this type of operation because of the interchangeability of the implements on the drive shaft. For example, on foreworking curd in Swiss cheese manufacture, the two harps are replaced with a paddle and a beater harp. This assembly is illustrated in Fig. 2 of the drawings. Rotation of the paddle and beater harp during the foreworking process is effective to reduce the size of the curd particles to very small dimensions, approximating that of a grain of wheat. In connection with Fig. 2, it will be observed that the beater harp 113 does not extend to the base of the tank 20. The reason for his stems from the discovery that considerably better working of the curd is achieved if the scraper blades 34 and 36, instead of the beater harp wires, are provided in the space adjacent the base of the tank 20. The combination of the beater harp and the scraper blades apparently provides a much more uniform product than could be achieved if the beater harp alone were employed.

The coaction between the scraper blades and the beater harp is as follows. As the curd settles onto the bottom of the vat and knits into a firm mass it is raised from the vat bottom and suspended in whey by the action of the scraper blades, at which point it is broken up by the beater harp. This reduced the stress upon the beater harp and makes possible a more uniform dispersion of the curd particles.

The apparatus described in the foregoing makes possible the efficient handling of large volumes of milk, e. g., 25,000 pounds or more, with a minimum of manual effort. Furthermore, the use of the apparatus in actual commercial production of cheese has indicated that the cheese made in this type of vat is of as high or higher quality than cheese made in rectangular cheese vats and in the case of Swiss cheese the grades of the finished cheese average somewhat higher than cheese made in a rectangular vat. We believe that this is attributable at least in part to the very efficient agitation by the improved harp structures, to the uniformity of the curd cutting made possible by the inclusion of the overruning clutch mechanism, and to the uniform heat application. The apparatus of the present invention has the further advantages of being considerably easier to clean than many presently used cheesemaking apparatus.

We claim:

1. In a cheesemaking apparatus comprising a tank, a centrally disposed rotatable shaft in said tank, means connected to said shaft for rotating said shaft, a plurality of arms extending radially from said shaft and rotatable therewith, implement receiving means on each of said arms and drive means interconnecting said shaft with said implement receiving means for rotating each of said implement receiving means on its own axis, the improvement which comprises means connected to said implement receiving means for releasing said implement receiving means from driving engagement with said drive means and for locking each of said implement receiving means with respect to its associated arm.

2. In a cheesemaking apparatus comprising a tank, a centrally disposed rotatable shaft in said tank, means connected to said shaft for rotating said shaft, a plurality of arms extending radially from said shaft and rotatable therewith, implement receiving means on each of said arms and drive means connected to said implement receiving means for rotating each of said implement receiving means on its own axis, the improvement which comprises means connected to said impdement receiving means and operable to release said implement receiving means from driving engagement with said drive means, and means for locking each of said implement receiving means in a fixed position on its own axis.

3. In a cheesemaking apparatus comprising a cylindrical tank, a centrally disposed rotatable shaft in said tank, a framework journalling one end of said shaft for rotation therein, a motor, a sub-frame carried by said shaft, a pair of implement receiving means carried by said sub-frame and drive means connecting said rotatable shaft with said implement receiving means for rotating each of said implement receiving means on its own axis, the improvement which comprises an overrunning clutch mechanism coupling said motor to said shaft, means connected to said implement receiving means for releasing said receiving means from driving engagement with said drive means, and means connected to each of said implement receiving means for selectively locking each of said implement receiving means in a fixed position on its own axis.

4. In a cheesemaking apparatus comprising a cylindrical tank, a centrally disposed rotatable shaft in said tank, a motor for rotating said shaft, a frame member rotatable with said shaft, a plurality of implement receiving means carried by said frame member and a drive means carried by said frame member and connected with said implement receiving means to rotate said implement receiving means upon rotation of said frame member, the improvement which comprises an overrunning clutch mechanism coupling said motor to said shaft, means connected to said implement receiving means for selectively releasing each of said implement receiving means from driving engagement with said drive means, and means connected to said implement receiving means for selectively locking each of said implement receiving means in a fixed position on its own axis.

5. In a cheesemaking apparatus comprising a cylindrical tank, a centrally disposed rotatable shaft in said tank, means connected to said shaft for driving said shaft, a plurality of arms extending from said shaft and rotatable therewith, implement receiving means on each of said arms, the improvement which comprises means for selectively connecting said implement receiving means in driving relation to said shaft, whereby each of said implement receiving means may be rotated on its own axis, scraper blades extending from a lower portion of said shaft in a non-radial direction with respect to the center of said shaft, means connected to said implement receiving means for selectively releasing each of said implement receiving means for driving engagement with said shaft, and means connected to said implement receiving means for selectively locking each of said implement receiving means in a fixed position on its own axis.

6. In a cheesemaking apparaus comprising a cylindrical tank, a centrally disposed rotatable shaft in said tank, means connected to said shaft for driving said shaft, a plurality of arms extending from said shaft and rotatable therewith, a pair of cheese harps detachably secured to said arms and drive means for selectively connecting said shaft with said harps whereby rotation of said shaft rotates each of said harps, the improvement which comprises a pair of scraper blades extending from said shaft below said cheese harps, means connected to said harps for selectively releasing each of said harps from driving engagement with said drive means, and means connected to said harps for selectively locking each of said harps in a fixed position on its own axis.

7. In a cheesemaking apparatus comprising a cylindrical tank, a centrally disposed shaft in said tank, means connected to said shaft for rotating said shaft, a first sprocket concentric with said shaft but not rotatable therewith, a radially extending arm secured to said shaft, an implement receiving assembly extending from said arm, a second sprocket secured to said implement receiving assembly and rotatable therewith, a chain connecting said first sprocket with said second sprocket whereby rotation of said shaft causes said implement receiving assembly to be rotated about the axis of said shaft and also about its own axis, the improvement which comprises means connected to said assembly for releasing said assembly from driving engagement with said second sprocket, and means connected to said assembly for selectively locking said assembly in a fixed position on its own axis.

8. In a cheesemaking apparatus comprising a cylindrical tank, a centrally disposed rotatable shaft in said tank, means connected to said shaft for driving said shaft, a plurality of arms extending from said shaft and rotatable therewith, implement receiving means on each of said arms, the improvement which comprises drive means selectively interconnecting said implement receiving means and said shaft, means connected to each of said implement receiving means for selectively locking each of said implement receiving means on its own axis, and means connected to each of said implement receiving means for selectively releasing each of said implement receiving means from driving engagement with said drive means.

References Cited in the file of this patent

UNITED STATES PATENTS

| | | |
|---|---|---|
| 964,935 | Poulin et al. | July 19, 1910 |
| 976,676 | Moore | Nov. 22, 1910 |
| 1,728,637 | Stoelting | Sept. 17, 1929 |
| 2,032,678 | Wegener | Mar. 3, 1936 |
| 2,244,765 | Christensen et al. | June 10, 1941 |

FOREIGN PATENTS

| | | |
|---|---|---|
| 23,566 | Switzerland | Mar. 9, 1901 |